(12) United States Patent
Sato

(10) Patent No.: US 11,731,463 B2
(45) Date of Patent: Aug. 22, 2023

(54) TIRE

(71) Applicant: Sumitomo Rubber Industries, Ltd., Kobe (JP)

(72) Inventor: Hana Sato, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 259 days.

(21) Appl. No.: 16/988,010

(22) Filed: Aug. 7, 2020

(65) Prior Publication Data

US 2021/0061018 A1    Mar. 4, 2021

(30) Foreign Application Priority Data

Aug. 28, 2019 (JP) .............................. JP2019-156073
Sep. 30, 2019 (JP) .............................. JP2019-180270

(51) Int. Cl.
*B60C 11/03* (2006.01)
*B60C 11/12* (2006.01)

(52) U.S. Cl.
CPC .......... *B60C 11/0306* (2013.01); *B60C 11/12* (2013.01); *B60C 2011/0348* (2013.01); *B60C 2011/0362* (2013.01)

(58) Field of Classification Search
CPC ................ B60C 11/0306; B60C 11/12; B60C 2011/0348; B60C 2011/0362; B60C 2011/129; B60C 5/00; B60C 11/13; B60C 11/03; B60C 11/1307; B60C 11/0316; B60C 11/1272
See application file for complete search history.

(56) References Cited

U.S. PATENT DOCUMENTS

| | | | | |
|---|---|---|---|---|
| 10,300,745 | B2 * | 5/2019 | Hibino | B60C 11/1307 |
| 2015/0352905 | A1 * | 12/2015 | Tanaka | B60C 11/125 152/209.18 |
| 2016/0167442 | A1 * | 6/2016 | Ito | B60C 11/12 152/209.1 |
| 2018/0015788 | A1 * | 1/2018 | Hayashi | B60C 11/0304 |

FOREIGN PATENT DOCUMENTS

| | | | | |
|---|---|---|---|---|
| CA | 2891759 | * | 5/2014 | ............. B60C 11/03 |
| EP | 3388257 | * | 4/2018 | ............. B60C 11/03 |
| JP | 2015-229408 A | | 12/2015 | |

\* cited by examiner

*Primary Examiner* — Galen H Hauth
*Assistant Examiner* — Shibin Liang
(74) *Attorney, Agent, or Firm* — Birch, Stewart, Kolasch & Birch, LLP

(57) ABSTRACT

A tire has a tread portion comprising: a crown land zone provided with a crown auxiliary groove and crown lateral grooves; and a shoulder land zone provided with a shoulder auxiliary groove and shoulder lateral grooves. The axial width of the shoulder land zone is larger than the axial width of the crown land zone. The groove widths of the crown auxiliary groove and the shoulder auxiliary groove are smaller than that of a shoulder main groove. The lateral crown groove comprises a radially outer wide portion and a radially inner narrow sipe-like portion.

18 Claims, 5 Drawing Sheets

TIRE

TECHNICAL FIELD

The present invention relates to a tire, more particularly to a vehicle tire.

BACKGROUND ART

Japanese Patent Application Publication No. 2015-229408 (Patent Document 1) discloses a tire in which crown land zones are provided with shallow crown circumferential grooves and crown sipes. The crown sipes and the shallow crown circumferential grooves help to improve wet performance of the tire.

SUMMARY OF THE INVENTION

Problems to be Solved by the Invention

In the tire disclosed in Patent Document 1, the crown land zones have a large number of block pieces divided by the crown sipes and the shallow crown circumferential grooves, therefore, the crown land zones have a problem such that uneven wear is likely to occur. On the other hand, shoulder land zones on both sides of the crown land zones are fundamentally liable to wear. Thus, the uneven wear resistance of the crown land zones and shoulder land zones has been required to be improved.

Therefore, in view of the above problems, the present invention was made, and a primary objective thereof is to provide a tire in which uneven wear resistance of crown land zones and shoulder land zones can be improved without sacrificing wet performance.

According to one aspect of the present invention, a tire comprise:
a tread portion provided with a shoulder main groove and a crown main groove disposed on a tire equator side of the shoulder main groove so that a shoulder land zone is defined between the shoulder main groove and a tread edge, and a crown land zone is defined between the shoulder main groove and the crown main groove,
wherein
the crown land zone is provided with
a crown auxiliary groove extending continuously in the tire circumferential direction, and
a plurality of crown lateral grooves extending in the tire axial direction,
the groove width of the crown auxiliary groove is smaller than the groove width of the shoulder main groove,
each of the crown lateral grooves comprises
a radially outer portion opening at the ground contacting top surface of the crown land zone, and
a radially inner sipe portion extending radially inwardly from the radially outer portion,
the shoulder land zone is provided with
a shoulder auxiliary groove extending continuously in the tire circumferential direction, and
a plurality of shoulder laterals extending in the tire axial direction,
the groove width of the shoulder auxiliary groove is smaller than the groove width of the shoulder main groove, and
the width in the tire axial direction of the shoulder land zone is greater than the width in the tire axial direction of the crown land zone.

According to another aspect of the present invention, a tire comprises:
a tread portion provided with a shoulder main groove and a crown main groove disposed adjacently thereto so that a crown land zone is defined between the shoulder main groove and the crown main groove,
wherein
the crown land zone is provided with a plurality of crown lateral grooves extending across the entire width of the crown land zone,
each of the crown lateral grooves comprises
a first portion which is curved convexly toward one side in the tire circumferential direction, and
a second portion which is curved convexly toward the other side in the tire circumferential direction, and
each of the crown lateral grooves comprises
a radially outer portion opening at the ground contacting top surface of the crown land zone, and
a radially inner sipe portion extending radially inwardly from the radially outer portion,
wherein
the groove width of the radially inner sipe portion is smaller than the groove width of the radially outer portion, and one of the groove walls of the radially outer portion is flush with one of the groove walls of the radially inner sipe portion.

It is preferable that the width in the tire axial direction of the shoulder land zone is 1.25 to 1.35 times the width in the tire axial direction of the crown land zone.

It is preferable that each of the crown lateral grooves comprises a first portion curved convexly toward one side in the tire circumferential direction, and a second portion curved convexly toward the other side in the tire circumferential direction.

It is preferable that the first portions of the crown lateral grooves are disposed on the crown main groove side, and thereby the second portions are disposed on the shoulder main groove side.

It is preferable that the first portion and the second portion of each crown lateral groove are connected with each other across the crown auxiliary groove.

It is preferable that the depths of the crown lateral grooves are 0.70 to 0.85 times the depth of the shoulder main groove.

It is preferable that the groove widths of the crown lateral grooves are 4.0 mm or less.

It is preferable that the depth of the above-said radially outer portion is 0.05 to 0.10 times the depth of the shoulder main groove.

It is preferable that, in the crown land zone, first corners formed between the crown lateral grooves and the shoulder main groove are chamfered.

It is preferable that the crown auxiliary groove is a straight groove extending in parallel with the tire circumferential direction.

It is preferable that the groove width of the crown auxiliary groove is 2.0 to 3.0 mm.

It is preferable that the depth of the crown auxiliary groove is 0.15 to 0.30 times the depth of the shoulder main groove.

It is preferable that the shoulder lateral grooves include first shoulder lateral grooves extending from the shoulder auxiliary groove toward the shoulder main groove, and second shoulder lateral grooved extending from the shoulder auxiliary groove toward the tread edge, and
the first shoulder lateral grooves are connected with the shoulder auxiliary groove at positions in the tire circumferential direction, the second shoulder lateral grooves are connected with the shoulder auxiliary groove at positions in the tire circumferential direction which are different from those of the first shoulder lateral grooves.

It is preferable that the groove widths of the shoulder lateral grooves are 1.0 to 1.5 mm.

It is preferable that the depth of the shoulder lateral grooves is 0.10 to 0.25 times the depth of the shoulder main groove.

It is preferable that the shoulder auxiliary groove extends in a zigzag or wavy shape in the tire circumferential direction.

It is preferable that the groove width of the shoulder auxiliary groove is 2.0 to 3.0 mm.

It is preferable that the depth of the shoulder auxiliary groove is 0.15 to 0.30 times the depth of the shoulder main groove.

It is preferable that the crown land zone comprises a plurality of crown blocks divided by the crown lateral grooves, and the length in the tire circumferential direction of each crown block is smaller than the width in the tire axial direction of the crown land zone.

DESCRIPTION OF THE PREFERRED EMBODIMENTS

The present invention can be applied to various vehicle tires, but suitably applied to pneumatic tires for heavy duty vehicles.

Thus, taking a pneumatic tire for heavy duty vehicles as an example, embodiments of the present invention will now be described in detail in conjunction with accompanying drawings.

As well known in the art, a pneumatic tire comprises a tread portion whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In the case of a pneumatic tire, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

The tread edges Te are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

Figure 1:
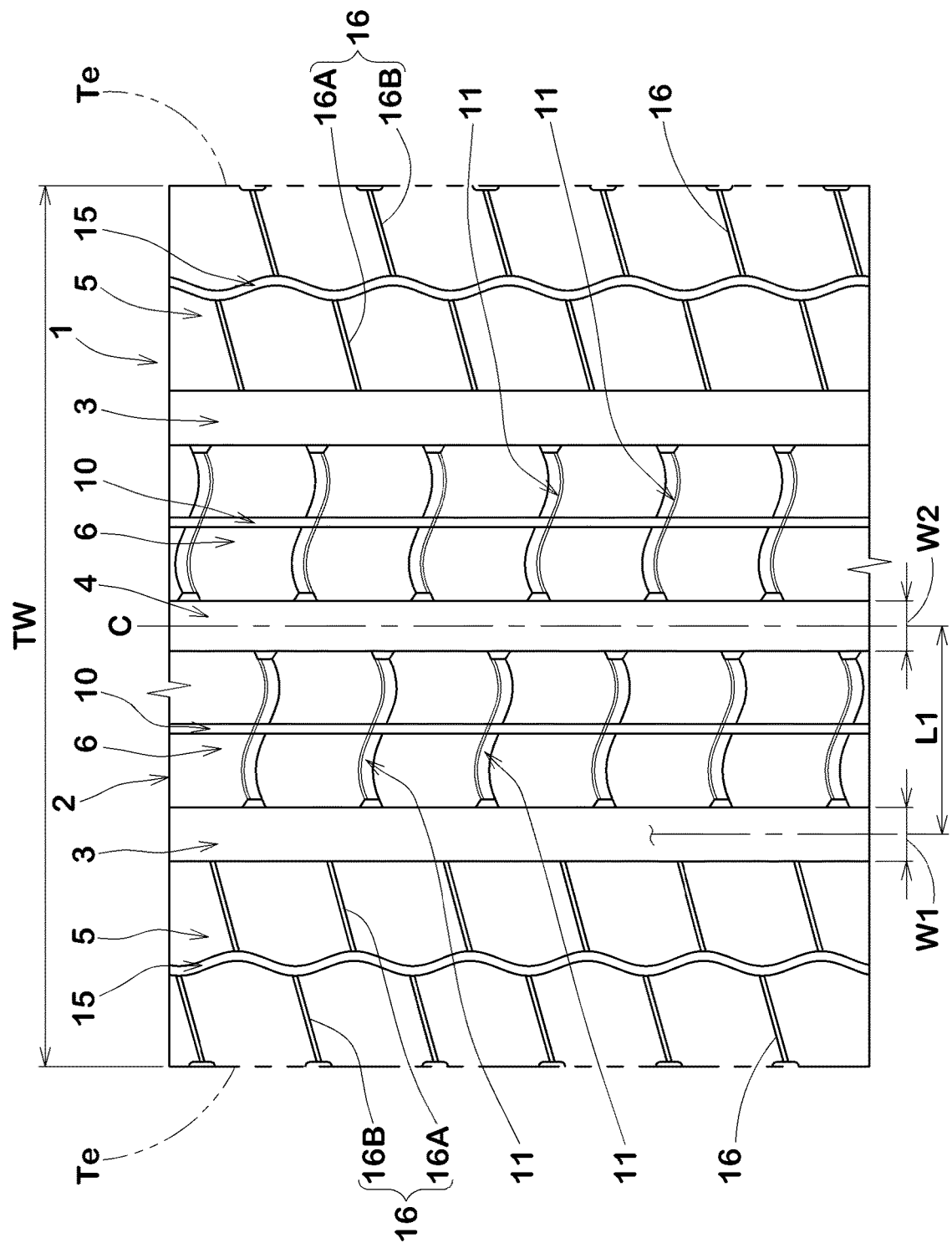
FIG. 1 is a developed partial view of the tread portion of a tire as an embodiment of the present invention.

FIG. 1 shows a part of the tread portion 2 of a tire 1 as an embodiment.

As shown in FIG. 1, the tread portion 2 is provided with a plurality of main grooves continuously extending in the tire circumferential direction.

In this embodiment, each of the main grooves is a straight groove extending parallel with the tire circumferential direction. But, each or some of the main grooves may be a nonlinear groove extending in a zigzag shape or a wavy shape, for example.

The main grooves in the present embodiment are two shoulder main grooves 3 and one crown main groove 4 disposed therebetween.

Preferably, the distance L1 in the tire axial direction from the tire equator c to the widthwise center line of each shoulder main groove 3 is set in a range from 0.20 to 0.30 times the tread width TW.

In this embodiment, one crown main groove 4 is disposed on the tire equator c. But, according to the present invention, one crown main groove 4 may be disposed on each side of the tire equator c.

Preferably, the groove width of each of the main grooves is set in a range from 4% to 7% of the tread width TW, for example.

Preferably, the groove depth of each of the main grooves is set in a range from 10 to 20 mm, for example.

In this embodiment, the groove width W1 of the shoulder main grooves 3 is larger than the groove width W2 of the crown main groove 4. For example, the groove width W1 is set in a range from 1.05 to 1.10 times the groove width W2. Such shoulder main grooves 3 help to improve wet performance.

By the main grooves 3 and 4, the tread portion 2 is axially divided into shoulder land zones 5 defined between the shoulder main grooves 3 and the tread edges Te, and crown land zones 6 defined between the shoulder main grooves 3 and the crown main groove 4.

Figure 2:
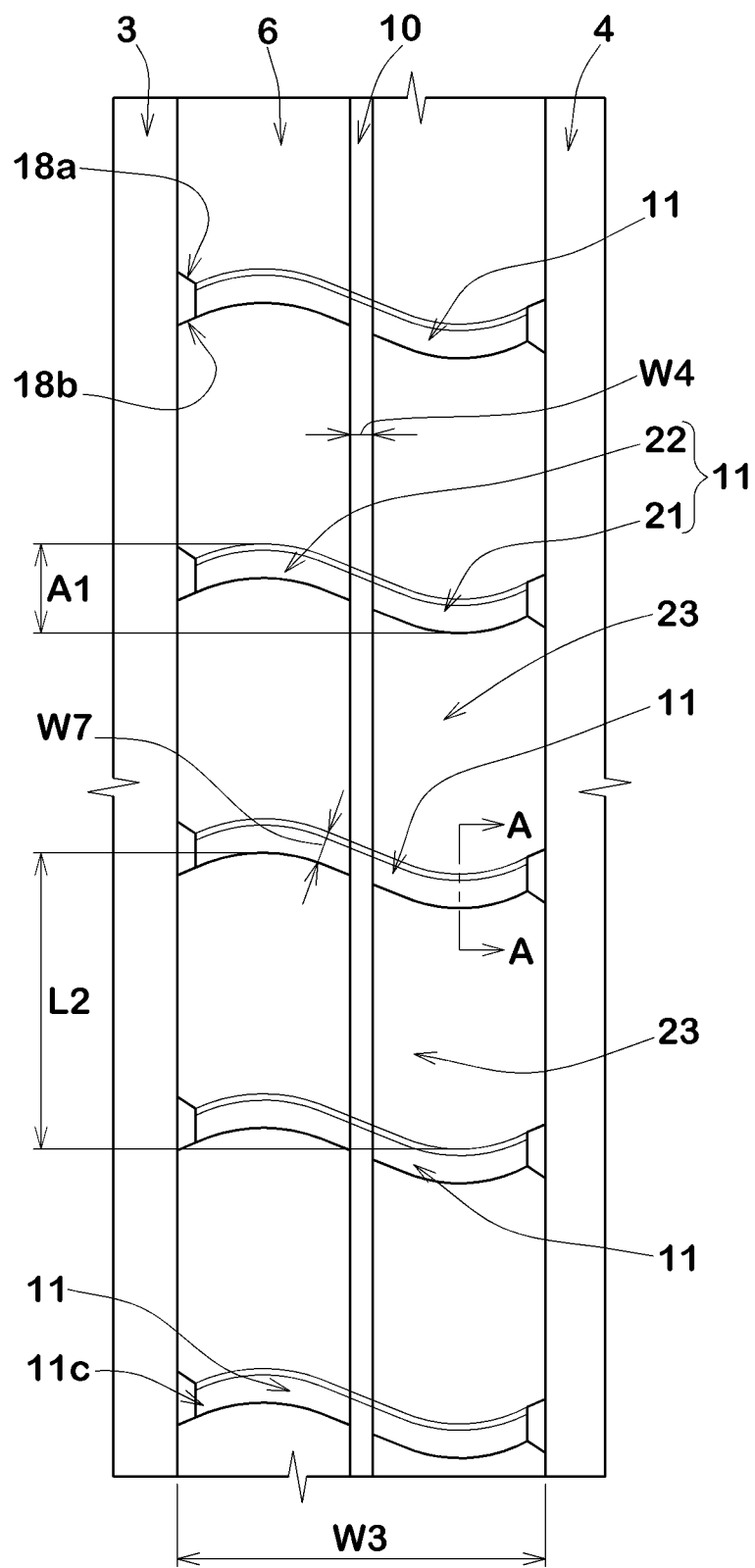
FIG. 2 is a top view of a part of the crown land zone of FIG. 1.

FIG. 2 shows a part of the crown land zone 6. The width W3 in the tire axial direction of the crown land zone 6 is set in a range from 0.10 to 0.25 times the tread width TW in this example.

The crown land zones 6 are each provided with a crown auxiliary groove 10 continuously extending in the tire circumferential direction, and a plurality of crown lateral grooves 11 extending in the tire axial direction.

In this embodiment, each of the crown auxiliary grooves 10 is a straight groove extending parallel with the tire circumferential direction.

The crown auxiliary groove 10 is disposed in the center region in the tire axial direction of the crown land zone 6. Specifically, the crown auxiliary groove 10 is disposed along the widthwise center line of the crown land zone 6.

The groove width W4 of the crown auxiliary grooves 10 is smaller than the groove width W1 of the shoulder main grooves 3. In this embodiment, the groove width W4 is 4.0 mm or less, and preferably 2.0 to 3.0 mm.

The depth of the crown auxiliary grooves 10 is smaller than the depth of the shoulder main grooves 3. In this embodiment, the depth of the crown auxiliary grooves 10 is not more than 0.50 times, preferably 0.15 to 0.30 times the depth of the shoulder main grooves 3.

The crown lateral grooves 11 in this example extend from the crown main groove 4 to the shoulder main grooves 3. Thus, the crown lateral grooves 11 intersect the crown auxiliary grooves 10.

Figure 3:
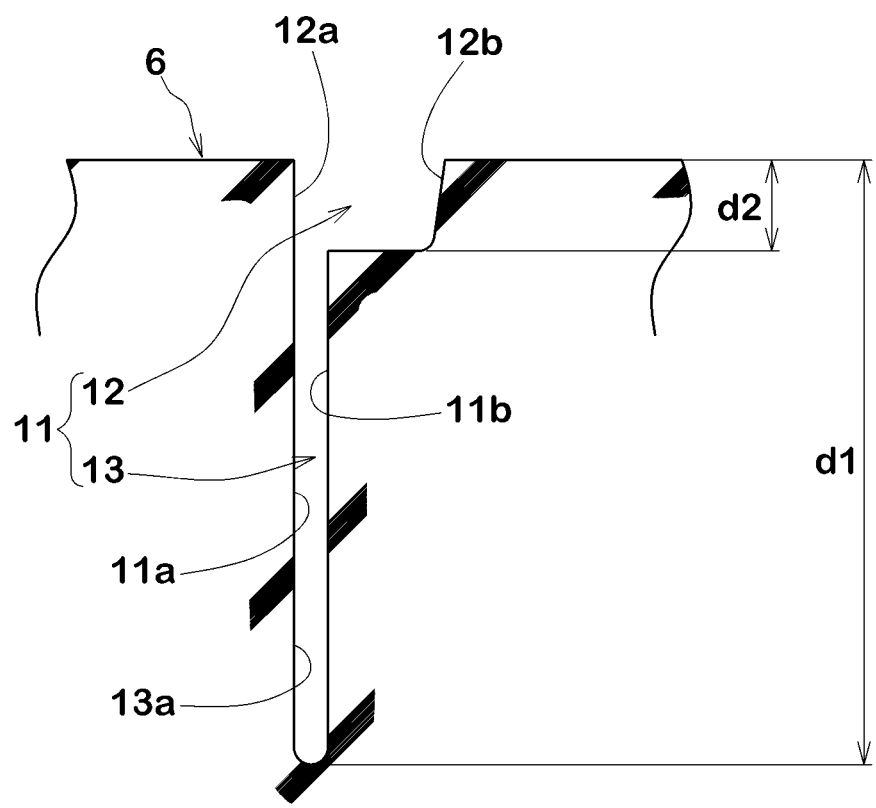
FIG. 3 is a sectional view taken along line A-A of FIG. 2.

FIG. 3 is a cross-sectional view of the crown lateral groove 11 taken along line A-A of FIG. 2.

As shown, the crown lateral groove 11 is composed of a radially outer portion 12 opening at the ground contacting top surface of the crown land zone 6, and a radially inner sipe portion 13 extending radially inwardly from the radially outer portion 12.

When the ground contact pressure acts on the crown land zone 6, the opposite groove walls of the crown lateral groove 11 may contact with each other in the sipe portion 13 to increase the apparent rigidity of the crown land zone 6. Therefore, the rigidity of the crown land zone 6 is maintained, while ensuring the wet performance.

Figure 4:
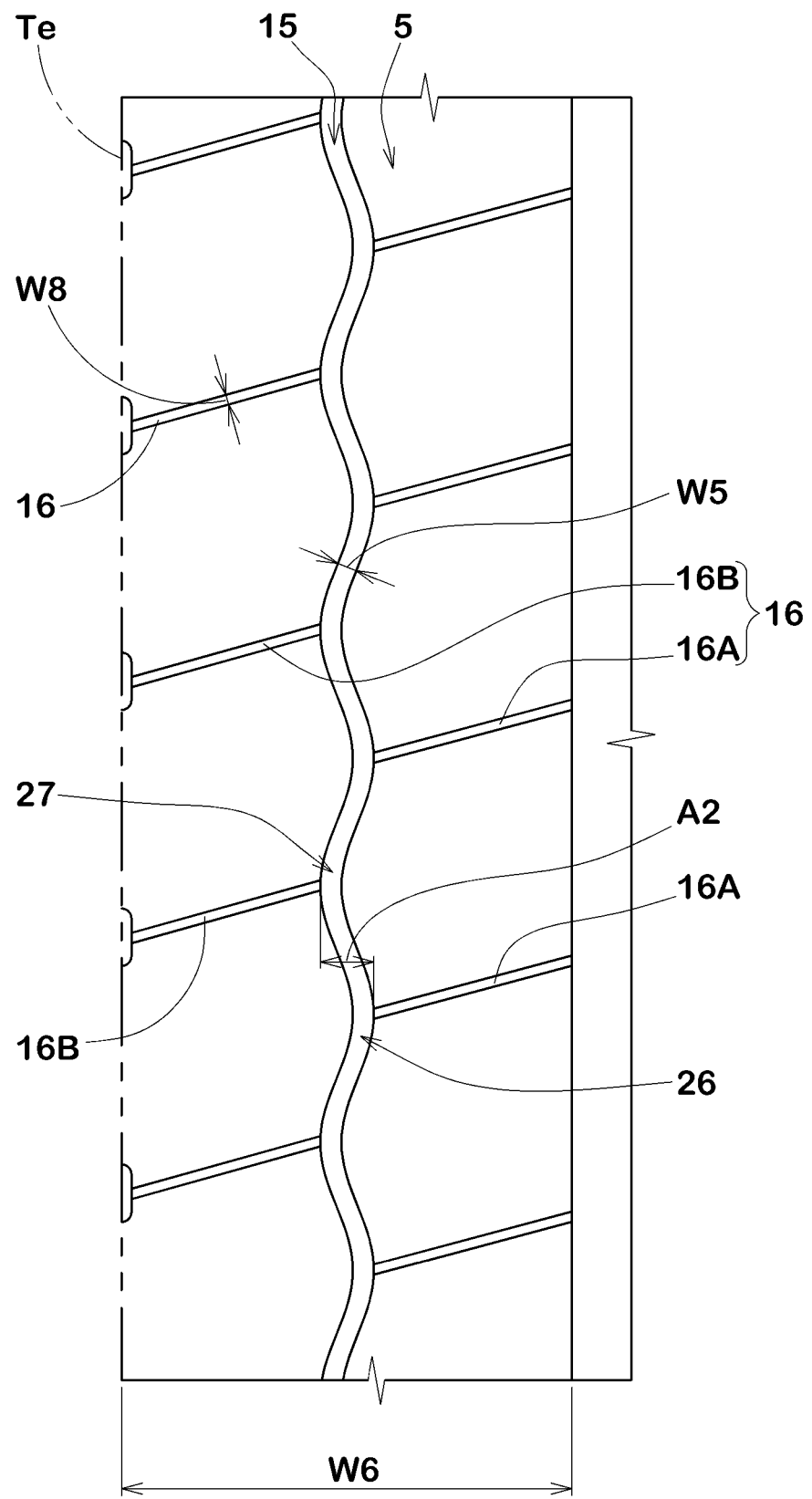
FIG. 4 is a top view of a part of the shoulder land zone of FIG. 1.

FIG. 4 shows a part of the shoulder land zone 5. As shown, the shoulder land zones 5 are each provided with a shoulder auxiliary groove 15 continuously extending in the tire circumferential direction, and a plurality of shoulder lateral grooves 16 extending in the tire axial direction. The groove width W5 of the shoulder auxiliary groove 15 is smaller than the groove width W1 of the shoulder main grooves 3. In this embodiment, the groove width W5 is set to be 4.0 mm or less, preferably set in a range from 2.0 to 3.0 mm.

The depth of the shoulder auxiliary grooves 15 is smaller than that of the shoulder main grooves 3. In this embodiment, the depth of the shoulder auxiliary grooves 15 is set to be 0.50 times or less, preferably set in a range from 0.15 to 0.30 times the depth of the shoulder main grooves 3.

The above-described grooves can provide sufficient groove volume and groove edges in order to provide excellent wet performance.

In the tire according to the present invention, the width W6 in the tire axial direction of each of the shoulder land zones 5 is larger than the width W3 in the tire axial direction of the crown land zones 6. As a result, the ground contact pressure of the crown land zones 6 is reduced to improve the uneven wear resistance of the crown land zoned 6.

Further, as the width of the shoulder land zone 5 is larger, the movement of the shoulder land zone 5 during traveling is suppressed, and the uneven wear resistance of the shoulder land zone 5 is also improved.

In order to further improve the uneven wear resistance of each land zone, it is preferred that the width W6 in the tire axial direction of the shoulder land zones 5 is set in a range from 1.25 to 1.35 times the width W3 in the tire axial direction of the crown land zones 6.

As shown in FIG. 2, in this example, each of the crown lateral grooves 11 extends in an s shape.

More specifically, the crown lateral groove 11 is composed of a first portion 21 curved convexly toward one side in the tire circumferential direction, and a second portion 22 curved convexly toward the other side in the tire circumferential direction, namely, curved oppositely to the first portion 21.

In each of the crown land zones 6, the first portions 21 are disposed on the same side, for example, on the crown main groove 4 side of the crown auxiliary groove 10, and the second portions 22 are disposed on the same side, accordingly on the shoulder main groove 3 side of the crown auxiliary groove 10.

In each of the crown lateral groove 11, the first portion 21 and the second portion 22 are connected with each other at the crown auxiliary groove 10, namely, across the crown auxiliary groove 10. Such crown lateral grooves 11 help to improve wet performance and uneven wear resistance in a well-balanced manner.

Although the crown lateral groove 11 in this example consists of one first portion 21 and one second portion 22, the present invention is not limited to such design. It may be possible that the crown lateral groove 11 is composed of two or more first portions 21 and two or more second portions 22.

Owing to the first portion 21 and the second portion 22, the crown lateral grooves 11 have their end portions 11c on the respective shoulder main groove 3 sides which intersect the respective shoulder main grooves 3 at an inclination angle with respect to the tire axial direction and are opened thereto.

The peak-to-peak amplitude A1 of the crown lateral groove 11 measured in the tire circumferential direction as shown in FIG. 2 is smaller than the groove width W1 of the shoulder main grooves 3 in this example. Preferably, the amplitude A1 is in a range from 0.60 to 0.80 times the groove width W1.

In this example, each of the first portion 21 and the second portion 22 is curved along an arc whose radius of curvature is in a range from 0.35 to 0.45 times the width W3 in the tire axial direction of the crown land zone 6. More specifically, the radius of curvature is set in a range from 8 to 35 mm, preferably 13 to 17 mm.

It is preferable than the radius of curvature of the first portion 21 is the same as the radius of curvature of the second portion 22. Such crown lateral groove 11 serves to suppress heel and toe wear.

The groove width W7 of the crown lateral groove 11 (which corresponds to the groove width of the radially outer portion 12) is set in a range of not more than 4.0 mm, preferably not more than 3.5 mm, but not less than 2.5 mm, for example. Such crown lateral grooves 11 enhance the uneven wear resistance, while ensuring the wet performance.

As shown in FIG. 3, in the cross section of the crown lateral groove 11 perpendicular to the longitudinal direction of the crown lateral groove 11, the opposite groove walls of the crown lateral groove 11 in the sipe portion 13 extend linearly in parallel with the tire radial direction in this example. Further, one of the opposite groove walls extends linearly in parallel with the tire radial direction from the groove bottom to the ground contacting top surface of the crown land zone 6. In other words, one groove wall 12a of the radially outer portion 12 and one groove wall 13a of the sipe portion 13 are flush with each other, and form one groove wall 11a of the crown lateral groove 11 which extends linearly in parallel with the tire radial direction from the groove bottom to the ground contacting top surface of the crown land zone 6. As a result, the wear of the edge formed by the one groove wall 12a is suppressed.

On the other hand, the other groove wall 11b of the crown lateral groove 11 is, as shown in FIG. 3, bent in a crank shape so that the groove width is increased toward the radially outside. That is, the groove wall 12b of the radially outer portion 12 is continuous with the groove wall of the sipe portion 13 via a bottom surface of the radially outer portion 12. Further, the groove wall 12b of the radially outer portion 12 is inclined in such a direction that the groove width of the radially outer portion 12 is gradually increased toward the radially outside.

The groove width of the sipe portion 13 is smaller than the groove width of the radially outer portion 12, and for example, not more than 1.0 mm, preferably in a range from 0.5 to 1.0 mm.

The depth d1 of the crown lateral groove 11 (from the ground contacting top surface of the crown land zone 6 to the radially innermost end of the sipe portion 13) is set in a range of not less than 0.50 times, preferably from 0.70 to 0.85 times the depth of the shoulder main grooves 3. Such crown lateral grooves 11 serve to exhibit high wet performance, while suppressing uneven wear.

The depth d2 or radial dimension of the radially outer portion 12 is set in a range of not more than 0.25 times, preferably from 0.05 to 0.10 times the depth of the shoulder main grooves 3, for example. Such radially outer portions 12 serve to exhibit excellent uneven wear resistance for a long period of time, while ensuring good wet performance at the start of use of the tire.

It is preferable that, as shown in FIG. 1, the crown lateral grooves 11 on one side of the crown lateral groove 11 intersect with the crown lateral groove 11 at different circumferential positions than those of the crown lateral grooves 11 on the other side of the crown lateral groove 11. Such arrangement of the crown lateral grooves 11 serves to further enhance the uneven wear resistance.

As shown in FIG. 2, each of the crown land zones 6 is circumferentially divided into crown blocks 23 by the crown lateral grooves 11.

It is preferable that the circumferential length L2 of each crown block 23 measured between its extreme ends in the tire circumferential direction is smaller than the width W3 in the tire axial direction of the crown land zone 6. For example, the circumferential length L2 is set in a range from 0.70 to 0.90 times the width W3. As a result, the rigidity of the crown blocks 23 in the tire circumferential direction is optimized, and heel and toe wear is effectively suppressed.

By the crown lateral grooved 11, each of the crown land zones 6 is provided with first corners 18a and second corners 18b formed between the crown lateral grooves 11 and the adjacent shoulder main groove 3.

In this embodiment, the first corner 18a is an acute angle corner, and the second corner 18b is an obtuse angle corner. Preferably, the first corners 18a are chamfered. As a result, uneven wear starting from the first corners 18a can be suppressed.

In this embodiment, the second corners 18b are not chamfered although they may be chamfered.

As shown in FIG. 4, each of the shoulder land zones 5 is provided, in its center portion in the tire axial direction, with the shoulder auxiliary groove 15.

In this example, the shoulder auxiliary groove 15 at least partially intersects with the axial center line or widthwise center line of the shoulder land zone 5.

In this example, the shoulder auxiliary groove 15 extends in a zigzag or wavy shape continuously in the tire circumferential direction.

Thus, the shoulder auxiliary groove 15 comprises first curved portions 26 curved convexly toward the adjacent shoulder main groove 3, and second curved portions 27 curved convexly toward the adjacent tread edge Te. The first curved portions 26 and the second curved portions 27 alternate in the tire circumferential direction.

The peak-to-peak amplitude A2 of the shoulder auxiliary groove 15 measured in the tire axial direction as shown in FIG. 4 is smaller than the above-said amplitude A1 of the crown lateral grooves 11. For example, the amplitude A2 is set in a range from 0.60 to 0.80 times the amplitude A1. As a result, the uneven wear resistance of each land zone is further enhanced.

The above-said shoulder lateral grooves 16 are inclined with respect to the tire axial direction in this example. The shoulder lateral grooves 16 disposed in each shoulder land zone 5 are inclined in one direction which is the same as the inclining direction of the end portions 11c on the shoulder main groove 3 side (shown in FIG. 2) of the crown lateral grooves 11 which are adjacent to the involved shoulder lateral grooves 16 across the shoulder main groove 3.

For example, the angle of the shoulder lateral grooves 16 with respect to the tire axial direction is set in a range from 5 to 15 degrees.

In this example, the groove width W8 of the shoulder lateral grooves 16 is smaller than the groove width W7 of the crown lateral grooves 11.

Further, the groove width W8 is smaller than the groove width W4 of the crown auxiliary grooves 10, and smaller than the groove width W5 of the shoulder auxiliary grooves 15.

For example, the groove width W8 of the shoulder lateral groove 16 is set in a range from 1.0 to 1.5 mm.

As a result, the rigidity of the shoulder land zones 5 is maintained, and uneven wear of the shoulder land zones 5 is suppressed.

The depth of the shoulder lateral grooves 16 is set in a range of not more than 0.50 times, preferably 0.10 to 0.25 times the depth of the shoulder main grooves 3 from the same viewpoint.

The shoulder lateral grooves 16 include first shoulder lateral grooves 16A extending from the shoulder auxiliary groove 15 toward the adjacent shoulder main groove 3, and second shoulder lateral grooves 16B extending from the shoulder auxiliary groove 15 toward the adjacent tread edge Te.

The second shoulder lateral grooves 16B intersect with the shoulder auxiliary groove 15 at circumferential positions different from those of the first shoulder lateral grooves 16A as shown in FIG. 4. Thereby, the uneven wear resistance is further improved.

In this example, the first shoulder lateral grooves 16A extend to the adjacent shoulder main groove 3 and are opened thereto. The second shoulder lateral grooves 16B extend to the adjacent tread edge Te and are opened thereat.

In this example, the first shoulder lateral grooves 16A extend from the respective first curved portions 26 of the shoulder auxiliary groove 15, preferably extend from the points of the respective first curved portions 26 most protruding toward the shoulder main groove 3.

In this example, the second shoulder lateral grooves 16B extend from the respective second curved portions 27 of the shoulder auxiliary groove 15, preferably extend from the points of the respective second curved portions 27 most protruding toward the tread edge Te.

Preferably, the depth of the second shoulder lateral grooves 16B is set to be smaller than the depth of the first shoulder lateral grooves 16A. For example, the depth of the second shoulder lateral grooves 16B is set in a range from 0.75 to 0.95 times the depth of the first shoulder lateral grooves 16A. As a result, uneven wear of the shoulder land zone 5 occurring near the tread edge Te can be suppressed.

While detailed description has been made of a preferable embodiment of the present invention, the present invention can be embodied in various forms without being limited to the illustrated embodiment.

Comparison Tests 1

Based on the tread pattern shown in FIG. 1, test tires of size 225/70R19.5 were experimentally manufactured and tested for wet performance and uneven wear resistance.

The test tires included working example tires Ex.1 to Ex.18 and comparative example tires Com.1 and Com.2.

Specifications of the test tires are shown in Tables 1 and 2. Otherwise the test tires had the same specifications.

The test tires mounted on 19.5×6.00 rims and inflated to 660 kPa were installed on all wheels of a test vehicle (2-2D type truck), and the following tests were conducted.

<Wet Performance Test>

In the wet performance test, the measured was the braking distance when the test vehicle running into a water pool of 2 mm depth on an asphalt road surface at a speed of 65 km/h was made sudden braking.

The test results are shown in Tables 1 and 2 by an index based on the reciprocal of the braking distance of the comparative example tire Com.1 being 100, wherein the larger the value, the better the wet performance.

<Uneven Wear Resistance Test>

The appearance of wear of the crown land zones and the shoulder land zones of the test tires after running for a given distance was visually evaluated.

The results are shown in Tables 1 and 2 by a score based on the comparative example tire Com.1 being 100, wherein the larger the numerical value, the better the uneven wear resistance.

TABLE 1

| Tire | Com. 1 | Com. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| shoulder land zone width W6/ crown land zone width W3 | 1.00 | 0.95 | 1.30 | 1.05 | 1.15 | 1.25 | 1.35 | 1.45 | 1.30 | 1.30 |
| crown lateral grooves' depth d1/ shoulder main groove depth | 0.75 | 0.75 | 0.75 | 0.75 | 0.75 | 0.75 | 0.75 | 0.75 | 0.65 | 0.70 |
| radially outer portion depth d2/ shoulder main groove depth | 0.05 | 0.05 | 0.05 | 0.05 | 0.05 | 0.05 | 0.05 | 0.05 | 0.05 | 0.05 |
| shoulder lateral grooves' depth/ shoulder main groove depth | 0.20 | 0.20 | 0.20 | 0.20 | 0.20 | 0.20 | 0.20 | 0.20 | 0.20 | 0.20 |
| crown auxiliary groove depth/ shoulder main groove depth | 0.25 | 0.25 | 0.25 | 0.25 | 0.25 | 0.25 | 0.25 | 0.25 | 0.25 | 0.25 |
| shoulder auxiliary groove depth/ shoulder main groove depth | 0.25 | 0.25 | 0.25 | 0.25 | 0.25 | 0.25 | 0.25 | 0.25 | 0.25 | 0.25 |
| wet performance | 100 | 98 | 102 | 100 | 101 | 102 | 101 | 101 | 100 | 101 |
| uneven wear resistance | 100 | 97 | 108 | 103 | 105 | 107 | 108 | 105 | 108 | 108 |

TABLE 2

| Tire | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| shoulder land zone width W6/ crown land zone width W3 | 1.30 | 1.30 | 1.30 | 1.30 | 1.30 | 1.30 | 1.30 | 1.30 | 1.30 | 1.30 |
| crown lateral grooves' depth d1/ shoulder main groove depth | 0.85 | 0.90 | 0.75 | 0.75 | 0.75 | 0.75 | 0.75 | 0.75 | 0.75 | 0.75 |
| radially outer portion depth d2/ shoulder main groove depth | 0.05 | 0.05 | 0.10 | 0.25 | 0.05 | 0.05 | 0.05 | 0.05 | 0.05 | 0.05 |
| shoulder lateral grooves' depth/ shoulder main groove depth | 0.20 | 0.20 | 0.20 | 0.20 | 0.10 | 0.25 | 0.20 | 0.20 | 0.20 | 0.20 |
| crown auxiliary groove depth/ shoulder main groove depth | 0.25 | 0.25 | 0.25 | 0.25 | 0.25 | 0.25 | 0.10 | 0.15 | 0.30 | 0.35 |
| shoulder auxiliary groove depth/ shoulder main groove depth | 0.25 | 0.25 | 0.25 | 0.25 | 0.25 | 0.25 | 0.10 | 0.15 | 0.30 | 0.35 |
| wet performance | 102 | 103 | 102 | 103 | 100 | 103 | 99 | 100 | 102 | 103 |
| uneven wear resistance | 106 | 104 | 107 | 105 | 108 | 106 | 109 | 108 | 108 | 105 |

From the test results, it was confirmed that the working example tires Ex.1 to Ex.18 were improved in the uneven wear resistance of the crown land zones and the shoulder land zones, while ensuring good wet performance.

Comparison Tests 2

Figure 5:
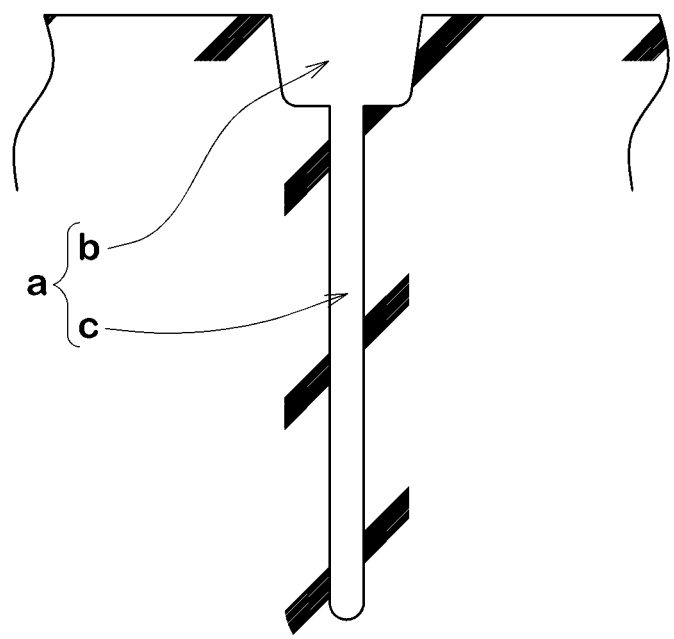
FIG. 5 is a cross-sectional view of the crown lateral groove of a reference example.

Based on the tread pattern shown in FIG. 1, test tires of size 225/70R19.5 were experimentally manufactured.
The test tires included working example tires Ex.19-Ex.31 and reference example tire Ref.
Specifications of the test tires are shown in Tables 3 and 4. The cross-sectional views of the crown lateral grooves are shown in FIG. 3 and FIG. 5. Otherwise the test tires had the same specifications.
The test tires were tested for wet performance and uneven wear resistance in the same manner as explained above. The test results are shown in Tables 3 and 4 in the same manner as explained above.

TABLE 3

| Tire | Ref | Ex. 19 | Ex. 20 | Ex. 21 | Ex. 22 | Ex. 23 | Ex. 24 |
|---|---|---|---|---|---|---|---|
| crown lateral grooves' cross-sectional view | FIG. 5 | FIG. 3 | FIG. 3 | FIG. 3 | FIG. 3 | FIG. 3 | FIG. 3 |
| crown lateral grooves' depth d1/ shoulder main groove depth | 0.75 | 0.75 | 0.65 | 0.70 | 0.85 | 0.90 | 0.75 |
| radially outer portion depth d2/ shoulder main groove depth | 0.05 | 0.05 | 0.05 | 0.05 | 0.05 | 0.05 | 0.10 |
| crown block length L2/ crown land zone width W3 | 0.80 | 0.80 | 0.80 | 0.80 | 0.80 | 0.80 | 0.80 |
| wet performance | 100 | 100 | 97 | 99 | 101 | 102 | 100 |
| uneven wear resistance | 100 | 106 | 107 | 106 | 105 | 104 | 106 |

TABLE 4

| Tire | Ex. 25 | Ex. 26 | Ex. 27 | Ex. 28 | Ex. 29 | Ex. 30 | Ex. 31 |
|---|---|---|---|---|---|---|---|
| crown lateral grooves' cross-sectional view | FIG. 3 | FIG. 3 | FIG. 3 | FIG. 3 | FIG. 3 | FIG. 3 | FIG. 3 |
| crown lateral grooves' depth d1/ shoulder main groove depth | 0.75 | 0.75 | 0.75 | 0.75 | 0.75 | 0.75 | 0.75 |
| radially outer portion depth d2/ shoulder main groove depth | 0.15 | 0.20 | 0.25 | 0.05 | 0.05 | 0.05 | 0.05 |
| crown block length L2/ crown land zone width W3 | 0.80 | 0.80 | 0.80 | 0.70 | 0.75 | 0.85 | 0.90 |
| wet performance | 101 | 102 | 102 | 101 | 100 | 100 | 99 |
| uneven wear resistance | 105 | 104 | 103 | 104 | 106 | 106 | 105 |

From the test results, it was confirmed that the working example tires Ex.19 to Ex.31 were improved in the uneven wear resistance of the crown land zones, while maintaining the wet performance.

DESCRIPTION OF THE REFERENCE SIGNS 2 tread portion
3 shoulder main groove
4 crown main groove
5 shoulder land zone
6 crown land zone
10 crown auxiliary groove
11 crown lateral groove
12 radially outer portion
13 sipe portion
15 shoulder auxiliary groove
16 shoulder lateral groove
Te tread edge

The invention claimed is:

1. A tire comprising:
a tread portion provided with a shoulder main groove and a crown main groove disposed on a tire equator side of the shoulder main groove so that a shoulder land zone is defined between the shoulder main groove and a tread edge, and a crown land zone is defined between the shoulder main groove and the crown main groove,
wherein
the crown land zone is provided with
a crown auxiliary groove extending continuously in the tire circumferential direction, and
a plurality of crown lateral grooves extending in the tire axial direction,
wherein the crown auxiliary groove is a straight groove and has a groove width that is smaller than the groove width of the shoulder main groove,
each of the crown lateral grooves comprises
a radially outer portion opening at a ground contacting top surface of the crown land zone, and
a radially inner sipe portion extending radially inwardly from the radially outer portion,
in a top view of the crown land zone, each of the crown lateral grooves comprises
a first portion curved convexly toward one side in the tire circumferential direction, and
a second portion curved convexly toward the other side in the tire circumferential direction,
wherein
the first portion and the second portion are connected with each other in an S-shaped manner across the crown auxiliary groove,
each of the first portion and the second portion are curved along an arc having a radius of curvature, wherein the radius of curvature of the first portion is the same as the radius of curvature of the second portion, and
a peak-to-peak amplitude A1 of the crown lateral groove measured in the tire circumferential direction is smaller than the groove width W1 of the shoulder main grooves, the shoulder land zone is provided with
- a shoulder auxiliary groove extending continuously in the tire circumferential direction, and
- a plurality of shoulder lateral grooves extending in the tire axial direction, wherein
- the shoulder lateral grooves have a groove width of 1.0 to 1.5 mm,
- the shoulder auxiliary groove is a zigzag groove, and
- the groove width of the shoulder auxiliary groove is smaller than the groove width of the shoulder main groove, and wherein in the shoulder land zone,
- the shoulder lateral grooves are first shoulder lateral grooves extending from axially inwardly protruding zigzag vertices of the shoulder auxiliary groove toward the shoulder main groove, and second shoulder lateral grooves extending from axially outwardly protruding zigzag vertices of the shoulder auxiliary groove toward the tread edge, and
- the first shoulder lateral grooves and the second shoulder lateral grooves are arranged in the tire circumferential direction in a staggered manner, and
- the width in the tire axial direction of the shoulder land zone is greater than the width in the tire axial direction of the crown land zone.

2. The tire according to claim 1, wherein the width in the tire axial direction of the shoulder land zone is 1.25 to 1.35 times the width in the tire axial direction of the crown land zone.

3. The tire according to claim 1, wherein in the crown land zone, first corners formed between the crown lateral grooves and the shoulder main groove are chamfered.

4. The tire according to claim 3, wherein the groove widths of the crown lateral grooves are 4.0 mm or less and substantially constant except for chamfered portions.

5. The tire according to claim 4, wherein the depths of the crown lateral grooves are 0.70 to 0.85 times the depth of the shoulder main groove.

6. The tire according to claim 5, wherein the depth of said radially outer portion is 0.05 to 0.10 times the depth of the shoulder main groove.

7. The tire according to claim 1, wherein the depth of the shoulder lateral grooves is 0.10 to 0.25 times the depth of the shoulder main groove.

8. The tire according to claim 1, wherein
- the crown land zone comprises a plurality of crown blocks divided by the crown lateral grooves, and
- the length in the tire circumferential direction of each crown block is smaller than the width in the tire axial direction of the crown land zone.

9. The tire according to claim 1, wherein the shoulder main groove is disposed on each side of the tire equator, and the crown main groove is disposed between the shoulder main grooves as one main groove.

10. The tire according to claim 9, wherein the two shoulder main grooves and the one crown main groove are straight grooves.

11. The tire according to claim 10, wherein the groove width W1 of the shoulder main grooves is in a range from 1.05 to 1.10 times the groove width W2 of the crown main groove.

12. The tire according to claim 1, wherein
- the groove width of the radially inner sipe portion is smaller than the groove width of the radially outer portion, and
- one of the groove walls of the radially outer portion is flush with one of the groove walls of the radially inner sipe portion.

13. The tire according to claim 12, wherein the first shoulder lateral grooves and the second shoulder lateral grooves disposed in the two shoulder land zones respectively defined by the two shoulder main grooves, are inclined in one direction with respect to the tire axial direction at an angle of from 5 to 15 degrees with respect to the tire axial direction.

14. The tire according to claim 13, wherein the groove width of the shoulder auxiliary groove is 2.0 to 3.0 mm.

15. The tire according to claim 14, wherein
- the crown land zone is provided on each side of the tire equator,
- the radially inner sipe portions of the respective crown lateral grooves disposed in the crown land zone on one side of the tire equator, are arranged on one side in the tire circumferential direction, and
- the radially inner sipe portions of the respective crown lateral grooves disposed in the crown land zone on the other side of the tire equator, are arranged on the other side in the tire circumferential direction.

16. The tire according to claim 14, wherein the groove width of the crown auxiliary groove is 2.0 to 3.0 mm.

17. The tire according to claim 16, wherein the depth of the crown auxiliary groove is 0.15 to 0.30 times the depth of the shoulder main groove.

18. The tire according to claim 17, wherein the depth of the shoulder auxiliary groove is 0.15 to 0.30 times the depth of the shoulder main groove.

* * * * *